(12) United States Patent
Hua

(10) Patent No.: US 7,961,391 B2
(45) Date of Patent: Jun. 14, 2011

(54) FREE SPACE ISOLATOR OPTICAL ELEMENT FIXTURE

(75) Inventor: Kun Hua, Minhang District (CN)

(73) Assignee: Finisar Corporation, Sunnyvale, CA (US)

( * ) Notice: Subject to any disclaimer, the term of this patent is extended or adjusted under 35 U.S.C. 154(b) by 139 days.

(21) Appl. No.: 12/047,853

(22) Filed: Mar. 13, 2008

(65) Prior Publication Data

US 2009/0231701 A1    Sep. 17, 2009

(51) Int. Cl.
*G02B 5/30* (2006.01)
*G02B 27/28* (2006.01)
(52) U.S. Cl. .................................. 359/484.03
(58) Field of Classification Search .................. None
See application file for complete search history.

(56) References Cited

U.S. PATENT DOCUMENTS

| | | | |
|---|---|---|---|
| 5,076,675 A * | 12/1991 | Kusaka et al. | 359/484 |
| 5,105,307 A * | 4/1992 | Nishiyama et al. | 359/484 |
| 5,452,122 A * | 9/1995 | Tsuneda et al. | 359/281 |
| 5,917,643 A * | 6/1999 | Watanabe et al. | 359/281 |
| 6,028,702 A * | 2/2000 | Sasaki | 359/484 |
| 6,577,779 B2 * | 6/2003 | Watanabe | 385/11 |
| 2005/0100263 A1 * | 5/2005 | Shi et al. | 385/11 |

* cited by examiner

*Primary Examiner* — Lee Fineman
(74) *Attorney, Agent, or Firm* — Maschoff Gilmore & Israelsen

(57) ABSTRACT

In this invention, a free space isolator is utilized to protect high performance semiconductor lasers from back reflections by stabilizing optical elements of the isolator within a glass base inside a magnetic ring.

16 Claims, 3 Drawing Sheets

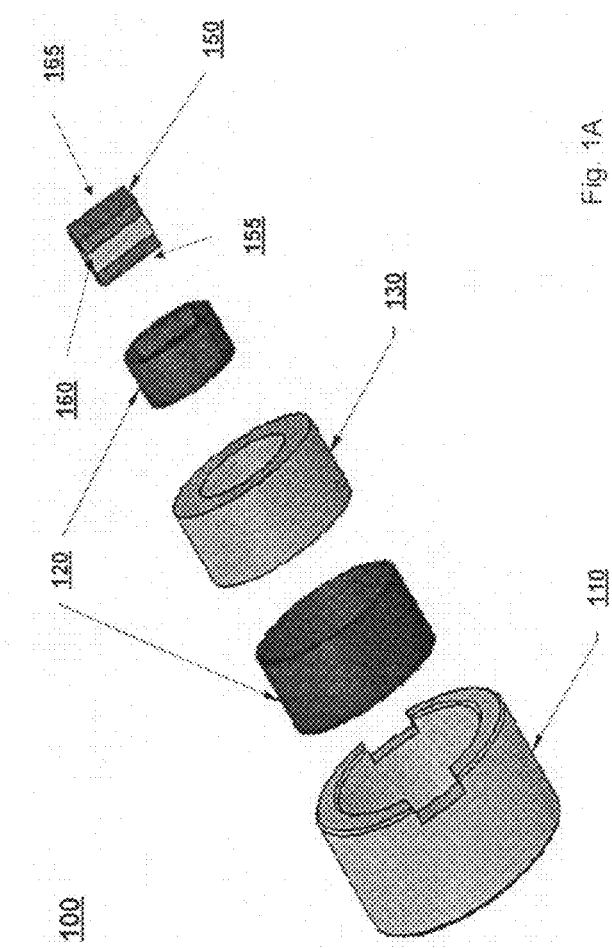
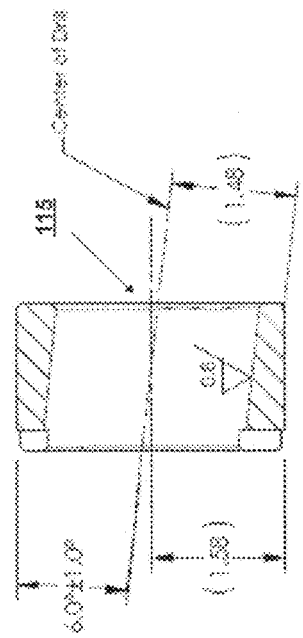

tilting an optical isolator element at an angle within a housing thereby blocking un-wanted light refractions from an optical system
305

Bonding the optical isolator element to a glass base by applying epoxy to only one side of the optical isolator element
315

Adjoining the glass base to a magnet ring by applying epoxy to the entire glass base and affixing the glass base into the inner side of the magnet ring
325

Bonding the magnet ring with a metal housing by applying epoxy to the outer surface of the magnet ring and placing magnet ring inside the metal housing
335

Figure 3

FREE SPACE ISOLATOR OPTICAL ELEMENT FIXTURE

BACKGROUND

1. Field of the Invention

The present invention relates generally to the field of optical communications systems, and more particularly to systems and methods that employ semiconductor lasers in a free space environment.

2. Background of the Invention

An optical isolator, or optical diode, is an optical component which allows the transmission of light in only one direction. Isolators are typically used to prevent un-wanted feedback into an optical oscillator. The operation of the isolator depends on the Faraday Effect (which in turn is produced by magneto-optic effects), which is used in a Faraday rotator. A magnetic field, B, applied to the Faraday rotator causes a rotation in the polarization of the light due to the Faraday Effect. The angle of the rotation, .beta. is given by, .beta.=vBd, where v is the Vedet constant of the material that the rotator is made from, and d is the length of the rotator.

A polarization dependent isolator is made of three parts, an input polarizer, a Faraday rotator, and an output polarizer, wherein the input polarizer is polarized vertically and the output polarizer is polarized at 45 degrees. Light traveling in the forward direction becomes polarized vertically by the input polarizer. The Faraday rotator rotates the polarization of the light by 45 degrees, enabling light to be transmitted through the isolator. Alternatively, light traveling in the reverse direction becomes polarized at 45 degrees by the analyzer wherein the Faraday rotator rotates the polarization by 45 degrees. In other words, the light is polarized horizontally and since the polarizer is vertically aligned, the light will be extinguished.

An important optical element in an isolator is the Faraday rotator. The characteristics include a high Verdet constant, low absorption coefficient, low non-linear refractive index, and high damage threshold. The polarization rotation due to the Faraday rotator is always in the same relative direction. In the forward direction, the rotation is positive 45 degrees and, in the reverse direction, the rotation is negative 45 degrees. Therefore, when the light travels in the forward and reverse directions, a rotation of 90 degrees is achieved and higher isolation is comparable.

Optical isolators are used in optical communication systems, and especially used with semiconductor lasers. As the transmission rates used in optical communications systems have increased, the performance required of lasers used in such systems has also increased.

It is well known that light reflected back from some parts of an optical communications system will adversely affect the operation in high performance lasers. Such adverse affects include fluctuations in the spectrum, line width, or intrinsic noise of the laser.

Therefore, what is desired is an optical isolator(s) that protects high performance semiconductor lasers from reflections and limit un-wanted positional changes of an optical isolator element within a free space isolator design by decreasing deficiencies from movements of the optical isolator element.

SUMMARY OF THE INVENTION

The present invention discloses an apparatus and method that employ a free space isolator in a communication system. In various embodiments of the present invention, the sub-assembly of the free space isolator comprises an optical element and a glass base wherein the glass base is adjoined with the optical element by applying a small amount of epoxy to one side of the optical element. A fixture provides the angle of the optical isolator element and secures the optical element to the glass base, which blocks un-wanted reflective light from the system. The optical isolator element's movement is limited because a small amount of epoxy is applied and the glass base secures the optical isolator element thereby creating a more stable, reliable, and desirable free space isolator design.

The use of epoxy is commonly used to connect components of an optical device. The effects that temperature and humidity have on epoxy are deleterious causing the epoxy to shrink or expand. This characteristic of epoxy may create un-wanted and un-desirable positional changes of the optical isolator element. In various embodiments of the present invention, a free space isolator design is provided to protect high performance semiconductor lasers from un-wanted light reflections. The sub-assembly prevents un-wanted and un-desirable movement in the optical isolator element by decreasing the amount of epoxy used to combine the sub-assembly.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 1A illustrates an apparatus for securing an optical isolator element within a housing according to prior art.

FIG. 1B illustrates a housing with a tilt angle according to a prior art.

FIG. 3 illustrates a method for securing an optical isolator element within an housing according to various embodiments of the present invention.

DETAILED DESCRIPTION OF THE INVENTION

Figure 2B:
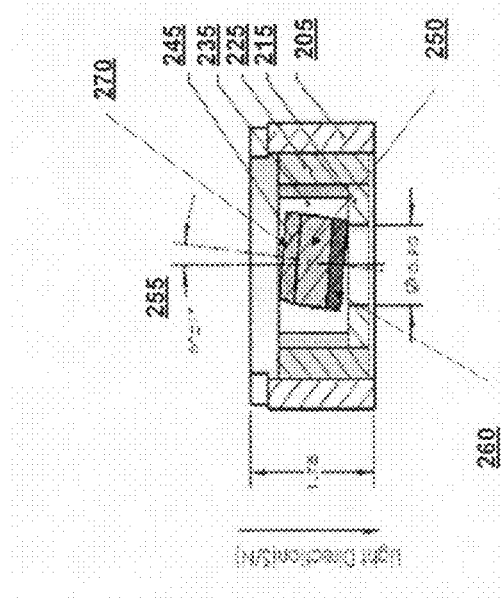
FIG. 2B illustrates an apparatus for securing an optical isolator element within a housing according to various embodiments of the present invention.

The present invention discloses and apparatus and method to employ a free space isolator in communication systems. In various embodiments of the present invention, the sub-assembly of the free space isolator comprises an optical element and a glass base wherein the glass base is adjoined with the optical element by applying a small amount of epoxy to one side of the optical element. The glass base is a part of a cylinder metal housing which provides no tilt angle. The sub-assembly including the glass base and isolator element is bonded in a magnet ring providing a stable and secure platform for the isolator. A fixture provides the angle of the optical isolator element and secures the optical element to the glass base blocking un-wanted reflective light from the system. The optical isolator element's movement is reduced because a small amount of epoxy is applied to only one side and the glass base secures the epoxy side of the optical isolator element thereby creating a more stable, reliable, and desirable free space isolator design In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

FIGS. 1A and 1B illustrate a prior design of a free space isolator 100 apparatus. The free space isolator 100 comprises an optical element 150, which further comprises a first polarizer 155, a second polarizer 165, and a Faraday rotator 160, a magnet ring 130, a cylinder metal housing 110 with a tilt angle 115 within the metal housing 110, and epoxy 120. The Faraday rotator 160 and first 155 and second 165 polarizer's are plate shaped and the surfaces are filled with epoxy 120. The optical element 150 comprises the first polarizer 155 surrounded by epoxy 120 coupled to the Faraday rotator 160 surrounded by epoxy 120 coupled to the second polarizer 165 surrounded by epoxy.

The optical isolator element 150 is bonded into the magnet ring 130. The optical isolator element 150 is surrounded by a ring of epoxy 120 and placed inside the magnet ring 130 bonding the optical isolator element 150 to the magnet ring 130. A magnetic flux is generated by the magnet ring 130 and is parallel to the ring axis. The magnet ring 130 is then surrounded by the epoxy ring 120 and is put into the metal housing 110. FIG. 1B is an illustration of the inside of the metal housing 110 in which the inside of the metal housing 110 is tilted 115 at an angle compared with the outside of the surface.

Figure 2A:
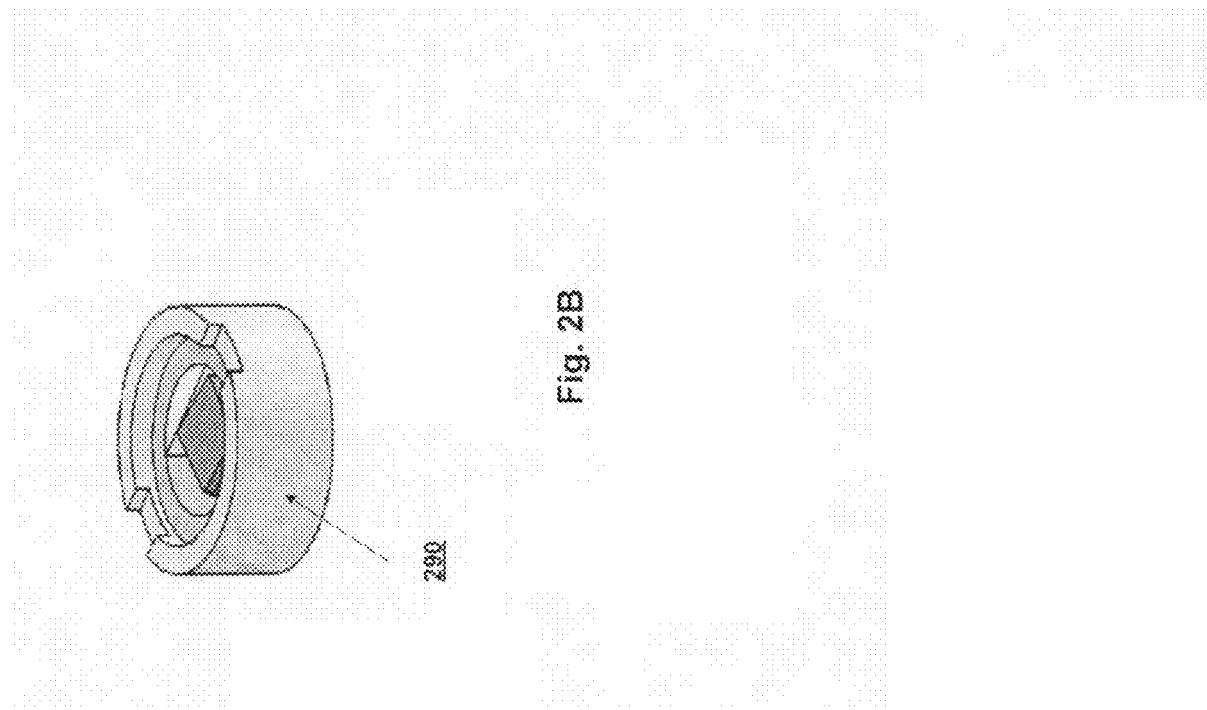
FIG. 2A illustrates an apparatus for securing an optical isolator element within a housing according to various embodiments of the present invention.

In an embodiment of the present invention, FIGS. 2A AND 2B illustrate a free space isolator 290 design. Free space isolator 290 comprises an optical isolator element 245; which further comprises Faraday rotator 250, a first polarizer 260, and a second polarizer 270, a magnet ring 225, a cylinder metal housing 205, a glass base 235, a metal ring 215, and epoxy as an adhesive.

One side of the optical isolator element 245 is bonded with the glass base 235 using epoxy. The epoxy side of the optical isolator element 245 is affixed to glass base 235 and the glass base 235 adjoins the optical isolator element 245 within the magnet ring 225. This sub-assembly provides that the optical isolator element 245 is directly or approximately centered within the cylinder metal housing 205. The angle 255 of the optical isolator element 245 is created when the optical isolator element 245 is affixed to the glass base 235. The angle provided is fixed and centralized according to the fixtures provided.

The metal housing 205 secures the magnetic ring 225 at a fixed angle with epoxy. The magnetic ring, in turn, secures the glass base 235 at a fixed angle with epoxy. This bonding provides a stable, more secure fixture for the isolator element 245. A first side of the optical isolator element 245 is bonded with the glass base 235 by applying epoxy to the bonding side of the isolator element 245. The metal ring 215 ensures that un-wanted light reflections are thwarted by it.

Therefore, in this invention the amount of epoxy used to fill gaps between the optical isolator element 245 and the magnet ring 225 is reduced and a fixture is implemented to secure the optical isolator element 245 into the glass base 235, which in turn is secures to the magnet ring 225. The reduction of epoxy applied to the isolator 245 and the use of a fixture to create the angle within the isolator 245 provides a more stable and reliable free space isolator When temperature and humidity changes occur, the use of less epoxy and a more stable, secure fixture allows fewer positional changes in the optical isolator element 245. In prior isolators, which employ more epoxy to adjoin the sub-assemblies to the main housing, as temperature and humidity changes occur, the epoxy expands or shrinks causing various positional changes in an optical isolator. These positional changes create a more un-stable and non-reliable free space isolator. Thus, in various embodiments of the present invention, the reduction of epoxy and the inclusion of a fixed glass base that provides a fixed angle for light refraction allows for a more reliable, stable, secure, and efficient free space optical isolator element. Alternatively, the free space isolator element may comprise multiple stages wherein a plurality of rotator's and polarizer's are bonded together with epoxy employing an identical sequencing as expressed in throughout this invention.

In another embodiment of the present invention, FIG. 3 illustrates a method to secure a sub-assembly to a housing creating a more reliable free space isolator design. The method comprising the steps of tilting an optical isolator element at an angle within a fixture thereby blocking un-wanted light reflection from an optical system 305. Bonding the optical isolator element to a glass base by applying epoxy to only one side of the optical isolator element 315. Adjoining the glass base to a magnet ring by applying epoxy to the entire glass base and affixing the glass base into the inner side of the magnet ring 325. Bonding the magnet ring with a metal housing by applying epoxy to the outer surface of the magnet ring and placing magnet ring inside the metal housing 335.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

We claim:

1. A method for forming an optical isolator and securing the optical isolator within a metal housing, the method comprising the steps of:

bonding a first Faraday rotator directly to first and second polarizers, the first and second polarizers being bonded to opposing sides of the Faraday rotator to form the optical isolator;

bonding a side of the optical isolator directly to a non-toroidal shaped glass base such that an optical signal is transmitted through opposing ends of the optical isolator without passing through the glass base;

securing the glass base directly to and within a magnet ring using epoxy, wherein the side of the glass base secured to the magnet ring is correspondingly curved so as to interface with an inside diameter of the magnet ring; and securing the magnet ring within an inner diameter of the metal housing, wherein the optical isolator is positioned at an angle resulting in light reflection being blocked in one direction, the angle being caused by a slope on the surface of the glass base bonded to the optical isolator.

2. The method of claim 1 wherein the optical isolator is assembled by sequentially bonding the first polarizer to a first side of the Faraday rotator and bonding a second side of the Faraday rotator to the second polarizer.

3. The method of claim 1 wherein the optical isolator is bonded to the glass base by applying epoxy to one side of the optical isolator and bonding that side with the glass base.

4. The method of claim 1 wherein the optical isolator is a multiple stage isolator comprising the first polarizer, the second polarizer, a third polarizer, the first Faraday rotator, and a second Faraday rotator.

5. The method of claim 4 wherein the multiple stage isolator is assembled by sequentially bonding the first polarizer to a first side of the first Faraday rotator, bonding a second side of the first Faraday rotator to a first side of the second polarizer, bonding a second side of the second polarizer to a first side of the second Faraday rotator, and bonding a second side of the second Faraday rotator to a first side of the third polarizer.

6. An optical isolator comprising:
an optical isolator element comprising a first Faraday rotator bonded to first and second polarizers;
a non-toroidal shaped glass base having a sloped surface that is bonded to a side of the optical isolator element, which secures the optical isolator element at a fixed angle;
a tubular-shaped magnetic ring, bonded to the glass base, the magnetic ring securing the glass base into a fixed position within an inner diameter of the magnetic ring; and
a tubular-shaped metal housing, an inner diameter of the metal housing being bonded to an outer diameter of the magnetic ringsuch that the metal housing is secured around the magnetic ring, wherein a side of the glass base that bonds to an inner diameter of the magnetic ring is curved and shaped by a corresponding diameter so as to secure the glass base to the inner diameter of the magnetic ring, and wherein an opposing side of the glass base is angled and flat so as to secure the opposing side of the glass base to the optical isolator and position the optical isolator at the fixed angle to the propagation of light as the light is passed through the optical isolator.

7. The isolator of claim 6 wherein the optical isolator element is assembled by sequentially bonding the first polarizer to a first side of the Faraday rotator and bonding a second side of the Faraday rotator to the second polarizer.

8. The isolator of claim 6 wherein the optical isolator element is a multiple stage isolator comprising the first polarizer, the second polarizer, a third polarizer, the first Faraday rotator, and a second Faraday rotator.

9. The isolator of claim 8 wherein the multiple stage isolator is assembled by sequentially bonding the first polarizer to a first side of the first Faraday rotator, bonding a second side of the first Faraday rotator to a first side of the second polarizer, bonding a second side of the second polarizer to a first side of the second Faraday rotator, and bonding a second side of the second Faraday rotator to a first side of the third polarizer.

10. The isolator of claim 6 wherein the optical isolator element is bonded to the glass base by applying epoxy to one side of the optical isolator element and bonding that side with the glass base.

11. The isolator of claim 6 wherein the glass base is bonded to the magnet ring by applying epoxy to the outer surface of the glass base.

12. The isolator of claim 6 wherein the magnet ring is bonded to the metal housing by applying epoxy to the outer surface of the magnet ring.

13. The isolator of claim 6 wherein a magnetic flux generated by the magnet is parallel to a ring axis.

14. An optical isolating system comprising:
a Faraday rotator, bonded between a first polarizer and a second polarizer, that blocks light at a first direction perpendicular to the Faraday rotator;
a non-toroidal shaped glass base having a sloped surface that is bonded to the Faraday rotator to secure the Faraday rotator at a fixed angle, wherein along an optical axis of light propagation a first side of the first polarizer extends beyond a first side of the second polarizer and on opposing sides of the first and second polarizers a second side of the second polarizer extends beyond a second side of the first polarizer thereby reducing an aperture through which light passes through the first polarizer, Faraday rotator, and second polarizer;
a magnetic ring, bonded to the glass base, the magnetic ring securing the base into a fixed position;
a metal housing, bonded to the magnetic ring, that secures the metal housing around the magnetic ring; and
wherein a magnetic flux generated by the magnet is parallel to a ring axis.

15. The optical isolating system of claim 14 wherein the first polarizer is bonded to the glass base by applying epoxy to one side of the first polarizer and bonding that side with the glass base.

16. The optical isolating system of claim 14, wherein the glass base has a curved side with a radius of curvature corresponding to that of an inner wall of the magnetic ring to which the glass base is bonded, the sloped surface of the glass base being on a side opposite the curved surface.

* * * * *